United States Patent [19]

Matsuoka et al.

[11] 4,300,789
[45] Nov. 17, 1981

[54] EMERGENCY ESCAPE DEVICE FOR SEAT BELTS

[75] Inventors: Hideoki Matsuoka, Yokohama; Yoshinobu Kondo, Kosai, both of Japan

[73] Assignees: Nissan Motor Co., Ltd., Yokohama; Fuji Kiko Co., Ltd., Tokyo, both of Japan

[21] Appl. No.: 115,042

[22] Filed: Jan. 24, 1980

[30] Foreign Application Priority Data

Jan. 29, 1979 [JP] Japan .................................. 54-9575

[51] Int. Cl.³ ............................................. B60R 21/02
[52] U.S. Cl. .................................... 280/801; 280/802; 280/807; 280/808
[58] Field of Search .................................. 280/801-808

[56] References Cited

U.S. PATENT DOCUMENTS

| 3,881,745 | 5/1975 | Chavez | 280/803 |
| 4,167,277 | 9/1979 | Rumpf | 280/807 |
| 4,218,076 | 8/1980 | Compeau | 280/804 |
| 4,220,355 | 9/1980 | Henderson | 280/804 |

FOREIGN PATENT DOCUMENTS

2460340 6/1976 Fed. Rep. of Germany .

Primary Examiner—Robert R. Song
Attorney, Agent, or Firm—Silverman, Cass & Singer, Ltd.

[57] ABSTRACT

An emergency escape device for seat belts comprising a buckle including a latch mechanism, a tongue operative to be engaged with and disengaged from the buckle, a fixed operative member fitted to a retractor, and a release means movably fitted to the retractor and operative to disengage the tongue from the buckle.

3 Claims, 12 Drawing Figures

EMERGENCY ESCAPE DEVICE FOR SEAT BELTS

BACKGROUND OF THE INVENTION

1. Field of the Invention

This invention relates to an emergency escape device which is used with a seat belt fastened to a car and which can release a passenger arrested by the seat belt in case of an emergency.

2. Description of the Prior Art

In a conventional, manual operation type seat belt, a tongue and buckle, constituting a joint for detachably fastening two ends of a lap belt, or shoulder belt play a role in an emergency escape device.

That is, the use of the tongue and buckle for the purpose of fastening the lap belt or shoulder belt around a passenger and releasing the belt therefrom simultaneously ensures an emergency escape ability from the seat belt. The presence of the buckle and tongue at the joint of the belt has heretofore been inconvenient for a passenger when he fastens the belt, but this must be considered as an inevitable consequence of the main purpose of fastening the belt to the passenger.

In the latest passive belt which can automatically fasten the seat belt to the passenger and release the belt therefrom, the conventional tongue and buckle are exclusively used in case of an emergency escape of the passenger from the car. In particular, a conventional lap belt and shoulder belt are not required to provide such a tongue and buckle at the joint thereof.

SUMMARY OF THE INVENTION

An object of the invention, therefore, is to provide an emergency escape device for passive seat belts, which can detach a retractor fitted to a car body in case of an emergency.

A feature of the invention is the provision of an emergency escape device for seat belts comprising a buckle including a latch mechanism which is fitted to a car body or to a retractor, a tongue fitted to the retractor or to the car body not fitted with the buckle, and operative to be engaged with and disengaged from the buckle, a fixed operative member fitted to the retractor, and a release means movably fitted to the retractor and operative to disengage the tongue from the buckle.

Further objects and features of the invention will be fully understood from the following detailed description with reference to the accompanying drawings, wherein:

DETAILED DESCRIPTION OF THE PREFERRED EMBODIMENTS

Figure 1:
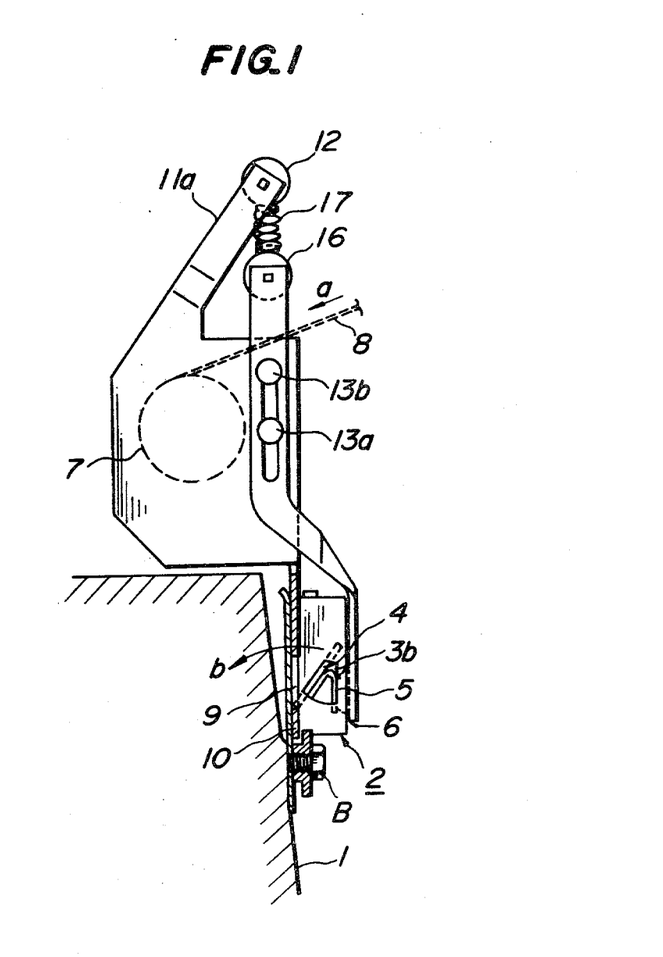
FIG. 1 is a side elevational view of a first embodiment of a device according to the invention partly in section.
Figure 2:
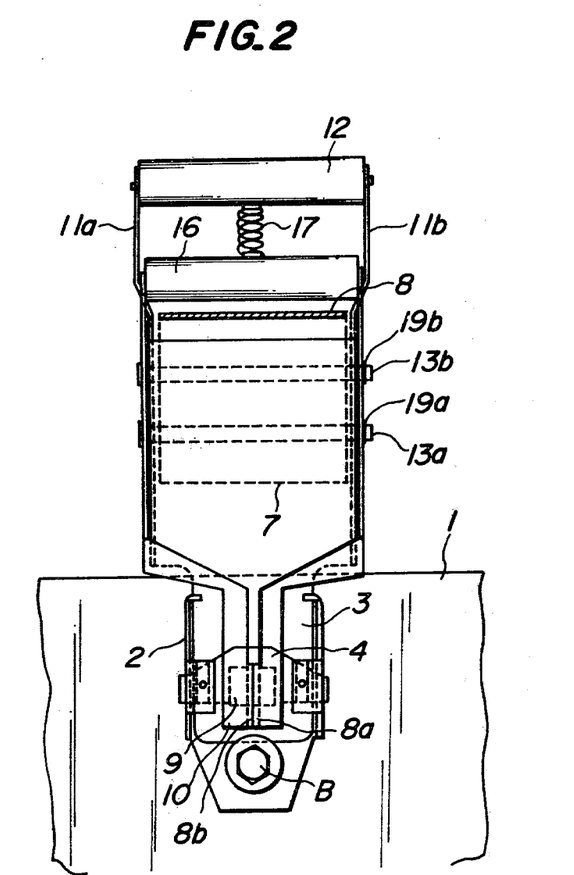
FIG. 2 is a front elevational view of the embodiment of FIG. 1.
Figure 3:
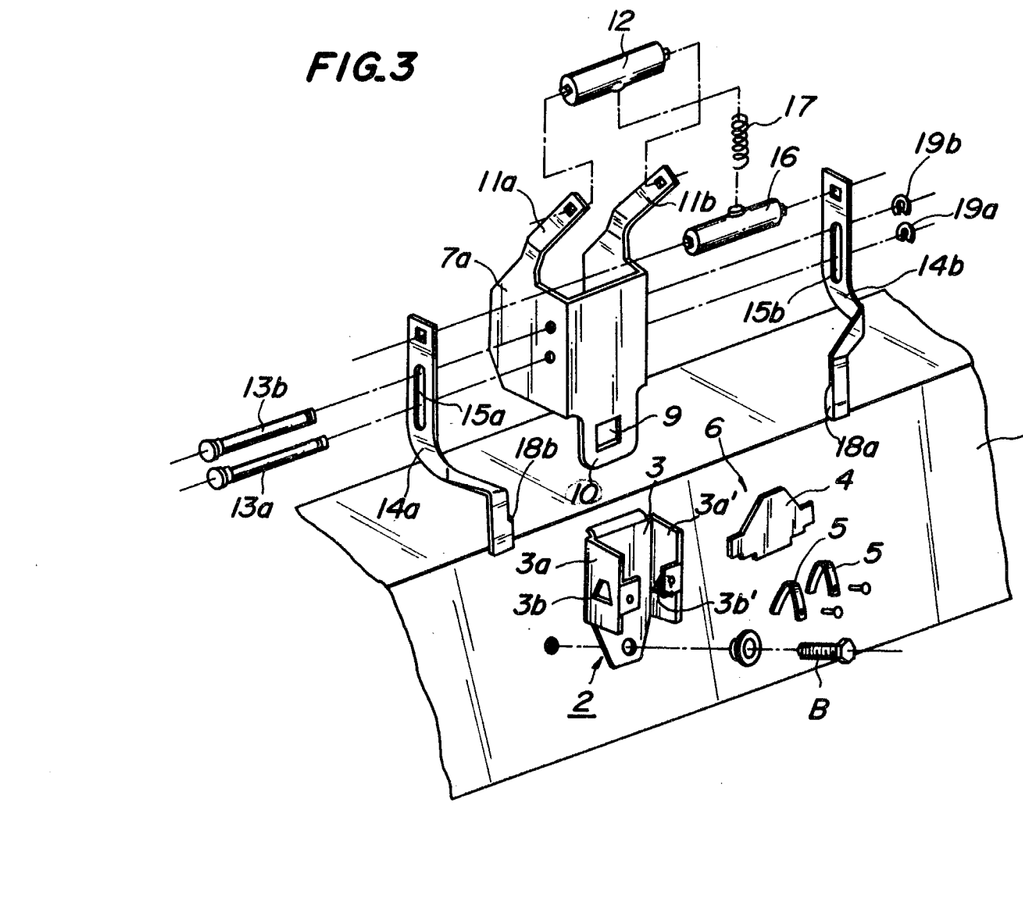
FIG. 3 is an exploded perspective view of the embodiment of FIG. 1.

Referring to FIGS. 1 to 3, reference numeral 1 designates a tunnel portion of a car floor (car body). The car body 1 is provided at its one side with a buckle 2 including a case 3 having a lower portion secured to the car body 1 by means of a bolt B. The buckle 2 is composed of the above mentioned case 3, a latch mechanism 6 including a latch plate 4 having two ends pivotaly journaled in trapezoidal holes 3b, 3b' provided in side plates 3a, 3a' of the case 3 and leaf springs 5, 5 each pushing the lower end of the latch plate 4 into a hole 9 provided in a tongue plate 10 to be described later.

Reference numeral 7 designates a retractor which functions to always wind a seat belt 8 in a direction shown by an arrow a by means of a spring (not shown) in a known manner. In addition, the retractor 7 encloses therein an emergency lock mechanism which functions, in case of an emergency such as a car collision or the like, to lock the delivery of the seat belt 8 in response to deceleration and acceleration of the car.

The retractor 7 is enclosed in a housing 7a provided at its lower portion with a tongue plate 10 made integral therewith and provided therein with the hole 9 adapted to be engaged with the lower portion of the latch plate 4 of the above mentioned buckle 2. Such positional relation between the buckle 2 and the tongue plate 10 may be reversed. That is, the tongue plate 10 may be secured to the car body side and the retractor 7 may be arranged at the side of the buckle 2.

In the present invention, the above mentioned conventional tongue and buckle are further added with the following constitutional elements.

That is, the housing 7a of the retractor 7 is provided at its upper portion with a pair of supporting arms 11a, 11b. These supporting arms 11a, 11b are provided at respective front ends with a fixed operative portion, that is, a fixed operative knob 12 secured thereto. Two parallel guide shafts or pins 13a, 13b extended through the side walls of the housing 7a and are spaced apart from each other by a given distance. The ends of these guide shafts 13a, 13b are slidably engaged through guide grooves 15a, 15b provided in release means, that is, a pair of release levers 14a, 14b. Between the upper ends of the release levers 14a, 14b is supported a movable operative member, that is, a movable operative knob 16 spaced apart from the fixed operative knob 12 by a given distance. Between the fixed operative knob 12 and the movable operative knob 16 is inserted a return spring 17 which normally serves to separate the movable operative knob 16 from the fixed operative knob 12 by a given distance, that is, such a distance that a passenger can grasp the knob 12 by his one hand and retain the knob 16 at the separated position. The release levers 14a, 14b are provided at their lower ends with releasing projections 18a, 18b. Each of the projections functions to be engaged with the upper portion of the latch plate 4 when the movable operative knob 16 is caused to be moved near to the fixed operative knob 12 in the case of need, and causes the latch plate 4 to rotate and disengage from the tongue plate 10. Reference numerals 19a, 19b designate snap rings for preventing the guide shafts 13a, 13b from slipping out of the guide grooves 15a, 15b, respectively.

In the device constructed as above described according to the invention, if the passenger who is arrested by the seat belt 8 wants to escape from a car compartment in case of an emergency such as a fire or the like due to collision of the car or the like, he can engage his thumb with the fixed operative knob 12 with the other fingers engaged, with the movable operative knob 16. Under such condition, if the passenger causes the movable operative knob 16 to approach the fixed operative knob 12 against the action of the spring 17, the release levers 14a, 14b are moved upwardly so as to move also upwardly the releasing projections 18a, 18b made integral with these releasing levers 14a, 14b, thereby rotating the latch plate 4 in a direction shown by an arrow b and hence disengaging it from the hole 9 provided in the tongue plate 10.

If then, both the movable operative knob 16 and the fixed operative knob 12 as a whole are moved upwardly, the tongue plate 10 is separated from the buckle 2 so as to separate the retractor 7 made integral with the tongue plate 10 from the car body. In this way, the passenger can be released from his arrested condition and can escape from the car to the outside.

Figure 4:
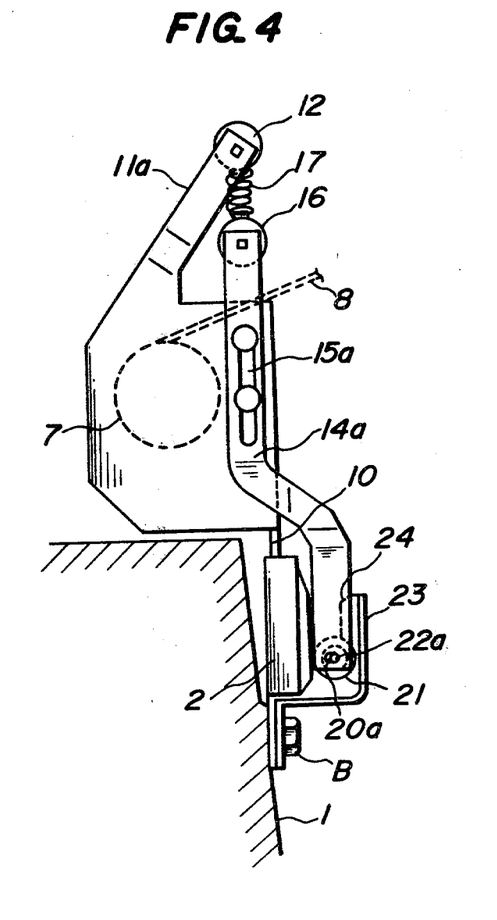
FIG. 4 is a side elevational view of a second embodiment of a device according to the invention.
Figure 5:
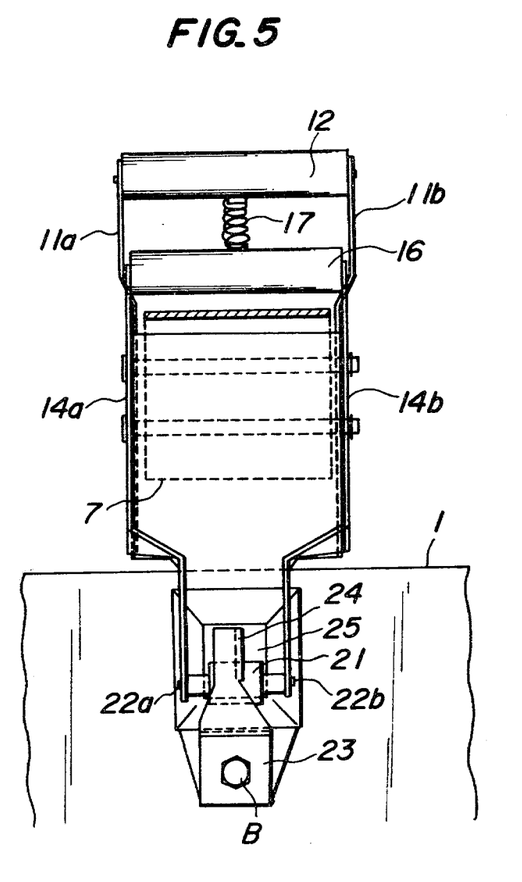
FIG. 5 is a front elevational view of the embodiment of FIG. 4.
Figure 6:
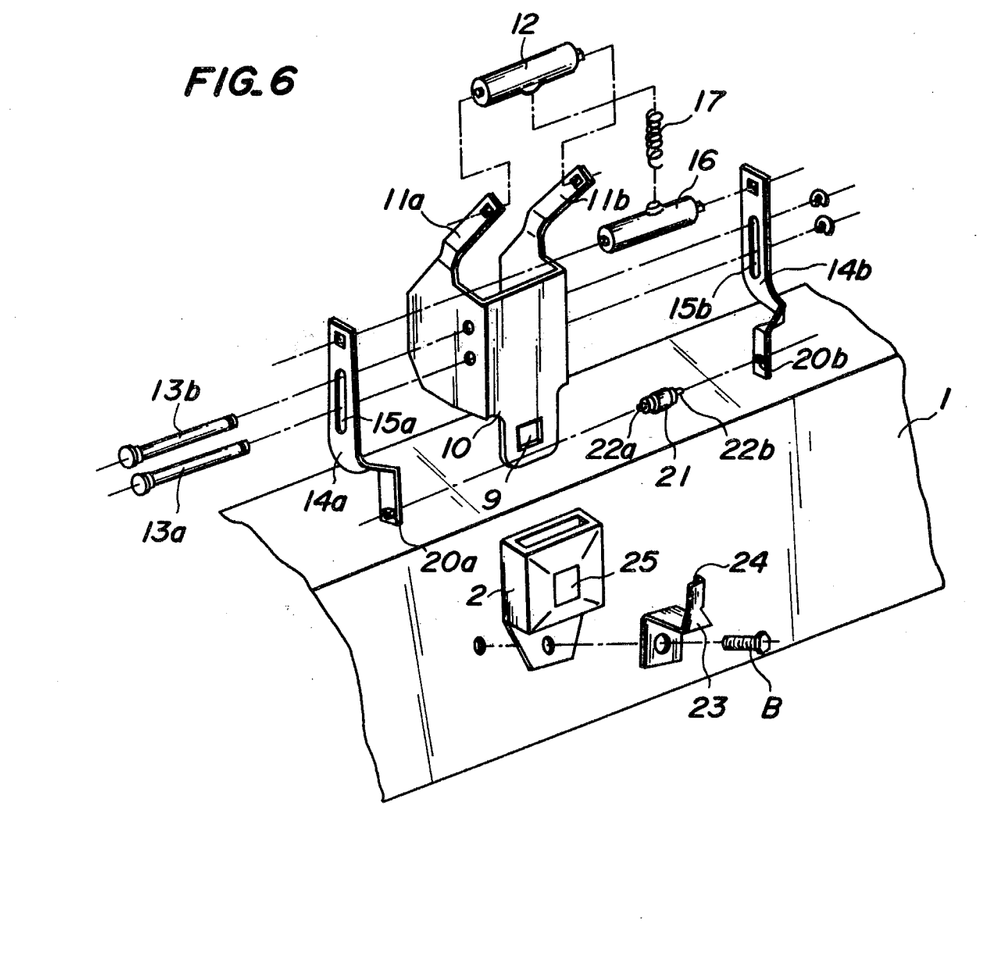
FIG. 6 is an exploded perspective view of the embodiment of FIG. 4.

FIGS. 4 to 6 show a second embodiment of a device according to the invention. In the present embodiment the release levers 14a, 14b are provided at their lower ends with horizontal elongate holes 20a, 20b instead of the releasing projection 18a, 18b provided in the first embodiment shown in FIGS. 1 to 3. These elongate holes 20a, 20b serve to slidably support rotary shafts 22a, 22b of a releasing roller 21. Provision is made of a bracket 23 having a lower portion secured to the tunnel portion 1 by means of the bolt B and having an upper portion provided with an operative cam piece 24 made integral therewith. The operative cam piece 24 functions to control the releasing operation of the roller 21.

In the manner similar to the first embodiment shown in FIGS. 1 to 3, if the movable operative knob 16 is caused to be moved near the fixed operative knob 12 so as to move upwardly the releasing levers 14a, 14b, the roller 21 engages with the cam piece 24 and hence is moved in the horizontal direction so as to move a push button 25, thereby disengaging the tongue plate 10 from the buckle 2. In the present embodiment, use is made of a latch mechanism which is the same as that of the first embodiment shown in FIGS. 1 to 3, but the latch plate 4 is released from the hole 9 provided in the tongue plate 10 by means of the push button 25. In the present embodiment, the push button 25 is covered such that the passenger could not easily push it under a normal condition or is arranged at a position where the push button 25 cannot easily be pushed, for example, at a position in a gap formed between the passenger's seat and the floor tunnel.

Figure 7:
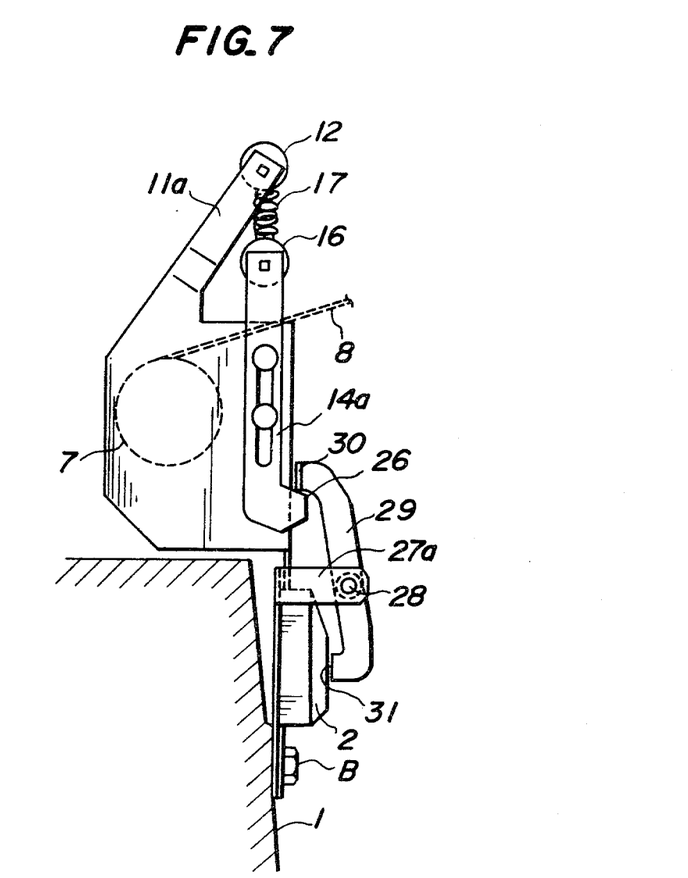
FIG. 7 is a side elevational view of a third embodiment of a device according to the invention.
Figure 8:
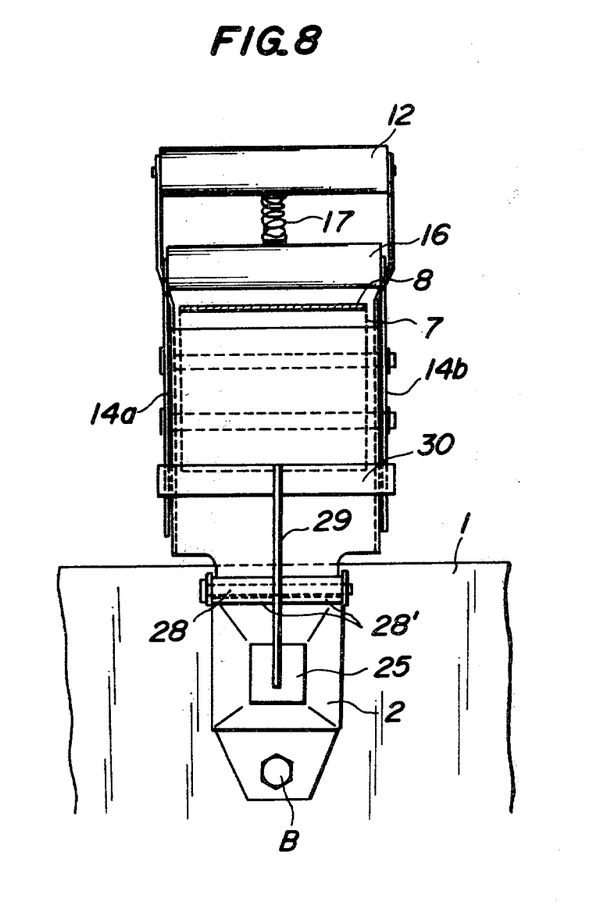
FIG. 8 is a front elevational view of the embodiment of FIG. 7.
Figure 9:
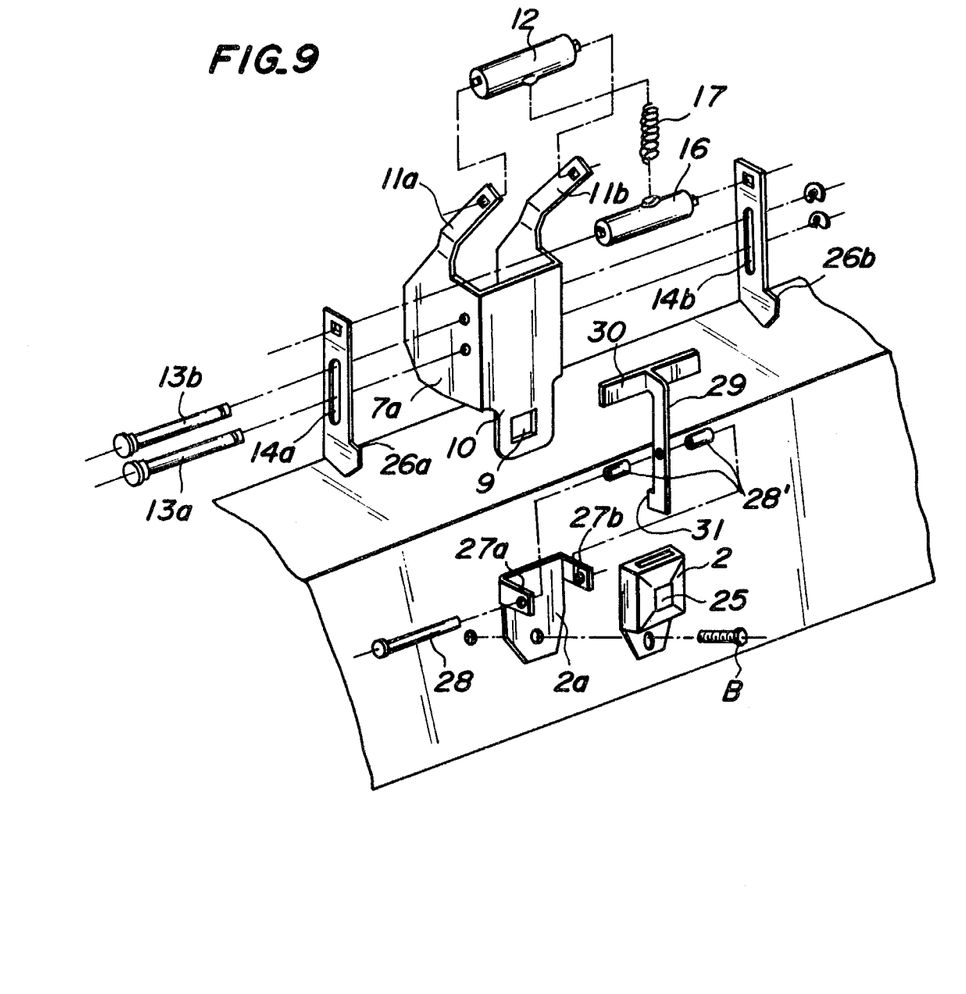
FIG. 9 is an exploded perspective view of the embodiment of FIG. 7.

FIGS. 7 to 9 shows a third embodiment of a device according to the invention. In the present embodiment, the release levers 14a, 14b are provided at their lower ends with tapered operative portions 26a, 26b instead of the releasing projections 18a, 18b used in the first embodiment shown in FIGS. 1 to 3. The buckle 2 is provided at its upper side edges with pivot shaft supporting arms 27a, 27b. These supporting arms 27a, 27b serve to rotatably support substantially at the center thereof a seesaw arm 29 by means of a pivot shaft 28 and spacer tubes 28', 28'. The seesaw arm 29 is provided at its upper end with a horizontal engaging piece 30 having ends adapted to be slidably engaged with tapered operative portions 26a, 26b of the release levers 14a, 14b, respectively. The seesaw arm 29 is provided at its lower end with a horizontal projection 31 opposed to the push button 25 of the buckle 2.

Similar to the first embodiment shown in FIGS. 1 to 3, if the movable operative knob 16 is moved toward the fixed operative knob 12 so as to upwardly move the release levers 14a, 14b, the tapered operative portions 26a, 26b function to push the ends of the seesaw arm 29 and rotate it. As a result, the horizontal projection 31 provided at the other end of the seesaw arm 29 is urged against the push button 25 of the buckle 2, thereby disengaging the tongue plate 10 from the buckle 2. In the present embodiment, the push button 25 is covered such that the passenger could not easily push it under a normal condition or is arranged at a position where the push button 25 could not easily be operated, for example, at a position in a gap formed between the passenger's seat and the floor tunnel.

Figure 10:
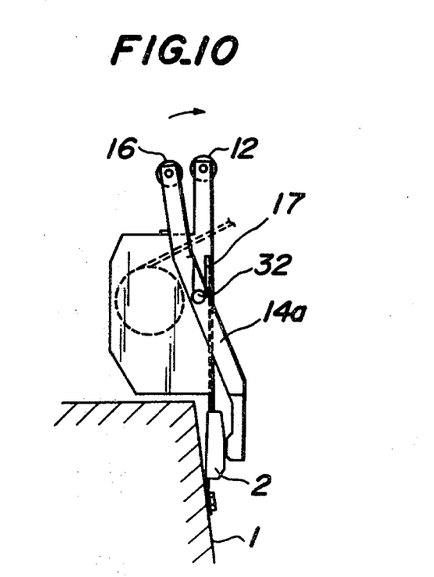
FIG. 10 is a side elevational view of a fourth embodiment of a device according to the invention.
Figure 11:
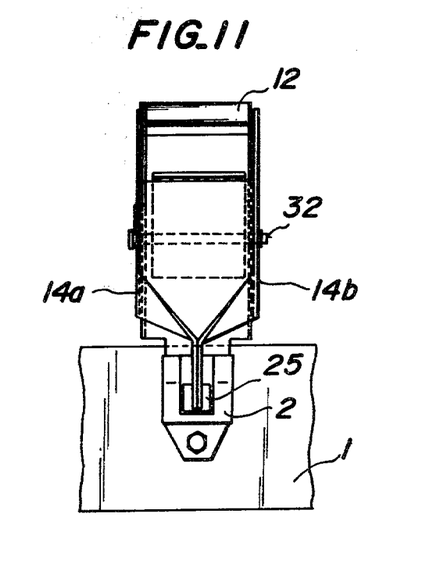
FIG. 11 is a front elevational view of the embodiment of FIG. 10.
Figure 12:
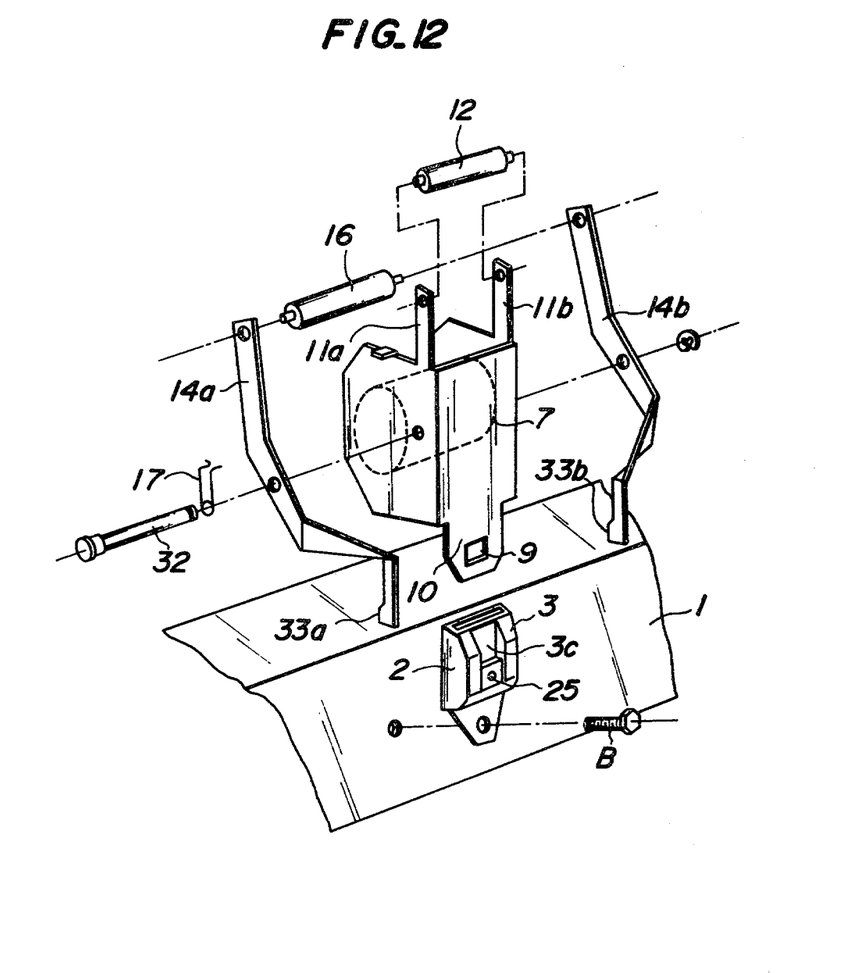
FIG. 12 is an exploded perspective view of the embodiment of FIG. 10.

FIGS. 10 to 12 show a fourth embodiment of a device according to the invention. Contrary to the first embodiment shown in FIGS. 1 to 3, in the present embodiment, the release means, that is, the release levers 14a, 14b are not made upwardly and downwardly slidable, but are rotatably supported at their centers by means of a rotary shaft 32. Lower portions of the release levers 14a, 14b are bent so as to allow these portions to come near the buckle 2. These bent portions are provided at their lower ends with release projections 33a, 33b. In the present embodiment, if the movable operative knob 16 is rotated in a clockwise direction shown by an arrow in FIG. 10 toward the fixed operative knob 12, the release levers 14a, 14b are also rotated so as to urge their release projections 33a, 33b against the push button 25 of the buckle 2, thereby disengaging the tongue plate 10 from the buckle. In the present embodiment, the projections 33a, 33b of the release levers 14a, 14b are moved slightly upwardly, so that the case of the buckle 2 is provided with an escape depression 3c. In addition, the spring 17 is not inserted between the fixed operative knob 12 and the movable operative knob 16, but is wound around the rotary shaft 32 so as to normally separate the movable operative knob 16 from the fixed operative knob 12.

As stated hereinbefore, the device according to the invention has a number of advantages. In the first place, the retractor provided at one end of the seat belt is provided with the emergency escape device, so that the seat belt arranged around the passenger is not required to be provided with the emergency escape device, and as a result, the passenger is not inconvenienced. Secondly, the lay out of the seat belt may freely be designed without any restriction. Third, the passenger can grasp the fixed operative knob and the movable operative knob in one hand, can bring them one toward the other and can raise them up so as to disengage the tongue from the buckle, thereby disengaging the retractor from the car body and causing the seat belt to release the passenger from his arrested condition. Fourth, the seat belt release operation can be effected in a continuous and rapid manner by the single upward motion of the passenger's hand, so that the device is very reliable in operation in case of an emergency. Fifth, the operative members are located above the retractor and hence are easy in operation. Finally, the operative members are extremely simple in construction and inexpensive.

What is claimed is:

1. An emergency escape device for a seat belt used with a car body, comprising:
    a buckle including a latch mechanism fixed to said body;
    a retractor housing having an upper and lower portion;
    a tongue secured to said lower portion of the retractor housing and operative to be engaged with the disengaged from said buckle latch mechanism;
    a fixed operating member secured on said upper portion of the retractor housing; and
    a pair of release levers movably mounted on the housing, the lower portion of the release levers being operative to release the latch mechanism upon movement of the release levers relative to the operating member.

2. The device as claimed in claim 1 wherein there is a movable operative member provided fixed on the upper ends of the release levers, spaced apart from said fixed operative member by a certain distance, the lower portion of the release levers including projections which are operative to release said latch mechanism.

3. The device as claimed in claim 1 wherein there is a movable operative member provided fixed on the upper ends of the release levers, spaced apart from said fixed operative member by a certain distance, and a roller carried on the lower portion of the release levers operative to release said latch mechanism.

* * * * *